(12) United States Patent
Theyssen et al.

(10) Patent No.: US 8,748,360 B2
(45) Date of Patent: Jun. 10, 2014

(54) METHOD OF LUBRICATING A CONVEYOR BELT

(75) Inventors: Holger Theyssen, Freinsheim (DE); Stefan Grober, Frankensthal (DE); Harry Kany, Hettenleidelheim (DE); Mark V. Clifton, Reading (GB)

(73) Assignee: Diversey, Inc., Sturtevant, WI (US)

( * ) Notice: Subject to any disclaimer, the term of this patent is extended or adjusted under 35 U.S.C. 154(b) by 405 days.

(21) Appl. No.: 12/517,600

(22) PCT Filed: Dec. 12, 2007

(86) PCT No.: PCT/US2007/087143
§ 371 (c)(1),
(2), (4) Date: Jul. 15, 2009

(87) PCT Pub. No.: WO2008/073951
PCT Pub. Date: Jun. 19, 2008

(65) Prior Publication Data
US 2010/0009879 A1   Jan. 14, 2010

Related U.S. Application Data

(60) Provisional application No. 60/869,825, filed on Dec. 13, 2006.

(30) Foreign Application Priority Data

Dec. 12, 2006  (EP) .................................. 06025688

(51) Int. Cl.
*C10M 105/22* (2006.01)
*C10M 125/24* (2006.01)
*C10M 129/92* (2006.01)

(52) U.S. Cl.
USPC ........... 508/479; 508/421; 508/433; 508/459; 508/477

(58) Field of Classification Search
USPC ......... 508/431, 459, 532, 564, 522, 481, 421, 508/433, 477, 479
See application file for complete search history.

(56) References Cited

U.S. PATENT DOCUMENTS

| | | | |
|---|---|---|---|
| 5,062,979 A | 11/1991 | Scharf et al. | |
| 6,372,698 B1 | 4/2002 | Strothoff et al. | |
| 6,575,291 B2 * | 6/2003 | Bennett et al. | 198/495 |
| 6,743,758 B2 | 6/2004 | Li et al. | |
| 6,806,240 B1 | 10/2004 | Hei et al. | |
| 6,855,676 B2 | 2/2005 | Li et al. | |
| 7,125,827 B2 | 10/2006 | Li et al. | |
| 2002/0025912 A1 * | 2/2002 | Person Hei et al. | 508/208 |
| 2003/0176302 A1 * | 9/2003 | Li et al. | 508/532 |
| 2004/0235680 A1 * | 11/2004 | Lawrence et al. | 508/175 |
| 2006/0211584 A1 * | 9/2006 | Court et al. | 508/433 |

FOREIGN PATENT DOCUMENTS

| | | |
|---|---|---|
| WO | 97/45509 | 12/1997 |
| WO | 01/12759 | 2/2001 |
| WO | 2006/088658 | 8/2006 |
| WO | 2007/090018 A1 | 8/2007 |

OTHER PUBLICATIONS

Lubrodrive RX (product information 2004).*
Macat (product information).*
International Search Report prepared by the Korean Intellectual Property Office.

* cited by examiner

*Primary Examiner* — Pamela H Weiss
(74) *Attorney, Agent, or Firm* — Foley & Lardner LLP

(57) ABSTRACT

The present invention relates to a method of lubricating a conveyor belt, wherein a lubricant concentrate containing at least 0.1 wt-% of at least one free fatty acid and at least one corrosion inhibitor is employed as a dry lubricant in a dry lubrication process.

19 Claims, No Drawings

METHOD OF LUBRICATING A CONVEYOR BELT

BACKGROUND AND SUMMARY OF THE INVENTION

The present invention relates to a method of lubricating a conveyor belt wherein a lubricant concentrate is employed as a dry lubricant in a dry lubrication process. The present invention further relates to the use of such lubricant concentrate as a dry lubricant, in particular for lubricating a conveyor belt.

Known conveyor belt lubricants are employed in applications in which good gliding contact between solid surfaces, for instance glass and metal, or plastic and metal must be ensured. These applications include bottle filling and conveying plants, where the lubricants are applied to the conveyor belts to ensure the trouble-free conveyance of bottles on the belt. In many known systems, a soap such as potash-based soft soap is used as the lubricant.

As a substitute for the soap-based lubricants, a variety of synthetic conveyor belt lubricants including certain amine compounds are being used. These synthetic lubricants have been described in, for example, EP-A-1690920, which discloses a lubricant concentrate containing a phosphate tri-ester. Said lubricant concentrate contains as further components an amine and an acid which may be an inorganic acid such as hydrochloric acid, nitric acid or phosphoric acid or an organic acid such as formic acid, acetic acid or oleic acid. Due to the presence of the amine, the respective lubricant does not contain the employed acid in its free form.

These conveyor belt lubricants are generally supplied as concentrates. Use concentrations (or use solutions) of such concentrates are usually prepared by applying typical dilution rates of 0.2-1.0% by weight of the respective concentrate in water depending on the friction requirement and the water type. Such aqueous belt lubricants (aqueous use solution) having a use concentrate of the active lubricating ingredients of significantly less than 0.1% by weight have been satisfactorily applied for many years. Such aqueous use solutions are also known as "wet lubricants".

WO 01/23504 relates to such a wet lubrication process, wherein an antimicrobial lubricant composition is used to treat or lubricate containers and/or conveyor systems for containers. The employed lubricant composition comprises a lubricating agent and an antimicrobially effective amount of a quaternary phosphonium compound. The lubricant agent comprises a non-neutralized fatty acid, which may be oleic acid.

U.S. Pat. No. 6,288,012 relates to a non-aqueous lubricant for lubrication of containers and conveyor systems, whereby the substantially non-aqueous lubricant can include natural lubricants, petroleum lubricants, synthetic oils, greases and solid lubricants.

U.S. Pat. No. 4,420,578 relates to a composition for coating returnable glass bottles comprising among others 0-50 wt.-% of a fatty carboxylic acid, for example mixtures of long-chain carboxylic acids. However, said composition is employed for coating glass bottles instead of lubricating a conveyor belt.

US-A 2005/0 288 191 relates to a conveyor lubricant composition comprising at least one lubricant such as oleic acid and at least one protectant for PET bottles such as alkyl ether carboxylic acid or salts thereof.

EP-A 1 840 196 relates to a lubricant composition for conveyor systems comprising phosphoric acid esters, ether carboxylates, water and $C_6$-$C_{22}$ fatty acid, such as oleic acids, and/or $C_6$-$C_{22}$ fatty alcohols.

Kao Chemicals GmbH (Emmerich, Germany) offers a lubricant concentrate under the trade name AKYPO GENE CL 756 which contains—among others—fatty acids (approx. 10 wt.-%) and which is amine-free. Kao also suggests a method of employing said lubricant concentrate as a wet lubricant, wherein the concentrate is diluted to conveyer belt lubricants with concentrations between 8 to 11% to form an aqueous emulsion. Said diluted conveyor belt lubricant is further diluted with water to 0.2-0.4% (aqueous use solution) to be finally applied on the conveyor belt as a wet lubricant.

U.S. Pat. No. 5,723,418 relates to a lubricant concentrate composition containing an effective lubricating amount of an amine, a corrosion inhibitor and a surfactant. A fatty acid may be added to said composition as a neutralizing agent for obtaining a ph-value ranging from about 5-10.

U.S. Pat. No. 5,399,274 relates to a lubricant composition for use in metal-working processes comprising a fatty acid, an amino alcohol and a phosphate ester. The fatty acids employed are neutralized with an amino alcohol and complexed with an organic phosphate ester for obtaining a pH of the lubricant of at least about 8. The lubricant is useful in sizing, coining and machining of powdered metal parts and/or conventional ferrous and non-ferrous metal parts.

US-A 2004/0 241 309 relates to an improved food-grade lubricant useful, for example, as hydraulic oil or compressor oil. The lubricant comprises at least one vegetable oil, at least one polyalphaolefin and at least one antioxidant.

However, none of the above-described (mostly aqueous) lubricants are employed in a dry lubrication process. Most of them are employed as use solutions and therefore as wet lubricants, some of them are even used in different applications such as hydraulic oils. Most of them may contain a fatty acid such as oleic acid as an optional or even a mandatory component, but the fatty acid is usually present in its neutralized form due to additional components such as neutralizers, amines or any other components causing a pH-value in the neutral or alkaline range.

On the other hand, the application of these aqueous lubricants (wet lubricants) has also resulted in high water usage rates and relatively high effluent costs for the user. Furthermore, when used as conventionally intended these aqueous lubricants flow off the conveyor track surface treated therewith, resulting in a waste of chemical and water, and causing a slippery floor surface which may constitute a hazard to operators working in the immediate environment and collecting on floors and other surfaces which then requires cleaning.

In order to overcome the before-mentioned disadvantages of employing wet lubricants, WO 01/07544 discloses the use of a liquid composition for lubricating conveyor belts as a so-called "dry lubricant". The liquid composition is suitable for producing a dry lubricant film which remains on the surface of the respective conveyor belt onto which it is applied (as a liquid) and which consequently does not flow off from said surface. The liquid is usually an aqueous phase (up to 95% by weight of water) and further comprises a silicone oil or other oils selected from vegetable oils, mineral oils and mixtures thereof. Vegetable oils may be soy oil, palm oil, olive oil or sunflower oil.

It is well known that such vegetable oils contain triglycerides, which are compounds formed from one molecule of glycerol (glycerine, which is a tri-hydric alcohol). Depending on the individual vegetable oil, different fatty acids are chemically bonded to glycerol. Olive oil, for example, contains triglycerides consisting of two radicals of oleic acid and one radical of palmitic acid chemically bonded to the glycerol backbone. Said vegetable oils may also contain mono- or diglycerides, having only one or two fatty acid radicals. However, said vegetable oils do not contain any free fatty acids in a significant amount. An overview of the most common vegetable oils in respect of the chemical composition can be found, for example, in the article of A. Zamora available on the internet (www.scientificpsychic.com_fitness_fattyacids). Further information can be obtained from the free internet encyclopedia Wikipedia for oleic acid (www.en.wikipedia.org/wiki/oleic_acid).

US-A 2005/0 059 564 relates to a composition and method of lubricating conveyor tracks or belts wherein the lubricant composition contains at least about 25 wt.-% of fatty acid. The lubrication process may optionally be carried out as a dry lubrication. In one embodiment, the fatty acid may be present in its free form. However, the lubricant composition requires the presence of mandatory components such as neutralizers or polyalkylene glycol polymers. Since neutralizers components such as amines or alkaline metal hydroxides are employed a rise of the respective pH-value to the alkaline range is caused. By consequence, the respective lubricant concentrate does not contain any fatty acid in its free form. A similar disclosure can be found in U.S. Pat. No. 6,427,826, U.S. Pat. No. 6,673,753 and U.S. Pat. No. 6,855,676. Nowhere within said documents describing a dry lubrication process as an optional form of lubricating a conveyor belt, a method as disclosed, wherein a lubricant concentrate containing at least one free fatty acid and at least one corrosion inhibitor is employed as dry lubricant.

One major advantage of the method of dry lubrication is the drastic reduction in the volumina of the respective liquid, which is employed for lubrication. In an ordinary dry lubrication of a conveyor belt, approximately 1.5 to 20 ml/h of the respective lubricant are applied on the conveyor belt (as dry lubricant), whereas in case of wet lubrication, approximately 10-30 l/h of an aqueous solution have to be applied on the same conveyor belt. The voluminas of the respective liquid lubricants to be employed on the conveyor belt usually differ by the factor of 1000 to 10000 (wet lubrication versus dry lubrication).

However, the method of dry lubrication as described, for example, in WO 01/07544 is also associated with some disadvantages especially due to the employment of dry lubricants containing vegetable oils, in particular mineral oils, a so-called blackening is observed on the bottom surface of the containers to be transported on the conveyor belt. This blackening is often caused by dirt usually attached to the container surface, especially in case of the transportation/re-filling of used containers or by wear of, for example, glass or metal originating from the objects to be transported on the conveyor belt. A further source of dirt on the conveyor belt are fractions of liquids such as beer or sugar-containing beverages, which have not been filled into the container during the respective (re-)filling process but have flown down on the outer surface of the respective container onto the conveyor belt. The blackening problem usually occurs only in the case of a dry lubrication process, but not during a wet lubrication process.

Since it is difficult to remove said mixture of dirt and vegetable oil or especially mineral oil from the conveyor belt to avoid blackening, the whole conveyor belt system has to be stopped from time to time to perform an additional cleaning step. This cleaning is usually performed by employing strong alkaline detergent compositions containing surfactants because the oil-dirt-mixtures especially when employing mineral oils, can only be insufficiently removed by ordinary aqueous detergent compositions. If the used up lubricant film is not completely removed from the conveyor belt, the blackening problem is not solved. In addition, the new lubricant film is formed incompletely causing problems in respect of the objects to be transported. After the cleaning, further time has to be spent to sufficiently (re-) to apply the lubricant on the respective conveyor belt (so-called starting phase) until the whole system can be operated without any problems in respect of the transportation of the containers.

Therefore, the object of the present invention is to provide a new method of dry lubrication for a conveyor belt.

The object is achieved by a method of lubricating a conveyor belt, wherein a lubricant concentrate containing at least 0.1 wt.-% of at least one free fatty acid and at least one corrosion inhibitor, is employed as a dry lubricant in a dry lubrication process.

DETAILED DESCRIPTION

A major advantage of the method according to the present invention is that excellent lubricity is provided on the conveyor belts (due to low friction) during the dry lubrication process. The method according to the present invention provides excellent lubricity independent of the kind/quality of the object to be transported or the material of the conveyor belt. The objects to be transported may be partially or completely made of glass, metal, carton, or plastics and the conveyor belt may be partially or completely made of steel or plastic. The method according to the present invention provides excellent lubricity for the transportation of, for example, glass bottles on stainless steel conveyor belts. The transportation of objects to be filled and in particular to be refilled on conveyor belts, where neither the object to be transported nor the conveyor belt itself is partially or completely made of plastics, has been quite complicated so far. The method according to the present invention provides improved lubricity for the transportation of used objects made of glass on stainless steel conveyor belts.

In addition, sufficient lubricity is maintained for a considerable time period during a subsequent washing step (without adding further lubricant). This is also advantageous, since the operation of the conveyor belt does not have to be interrupted at all or only for a much smaller period of time when removing dirt from the conveyor belt to avoid blackening. In contrast to dry lubricants based on oils, especially on mineral oils, the lubricant concentrates containing free fatty acids according to the present invention show a superior compatibility with water, especially when employed as an emulsion containing the free fatty acid, water and an emulsifier or when employed as a solution of the free fatty acid in an organic solvent.

Another advantage of the method according to the present invention is that due to the combination of a free fatty acid and a corrosion inhibitor the corrosion of the conveyor belt, further conveyor equipment and/or the object to be transported can be reduced. This is for example the case when objects made of tin plate are transported on a conveyor belt, even if the conveyor belt is made from stainless steel. The combination of a free fatty acid and a corrosion inhibitor has the additional effect of a reduced blackening on the objects to be transported.

Since the lubricant concentrate contains the fatty acid in its free form, the pH-value of the respective concentrate is usually in the acidic range, preferably in the range of pH 1-3. This is an advantage, since many lubricant concentrates according to the state of the art (or the respective use solution thereof) are in the neutral or alkaline range. Such lubricant concentrates usually contain further additives such as neutralizers (amines or alkaline hydroxides), chelating agents such as EDTA, polymers such as polyalkylene glycol or mineral oils such as silicon-based oils which optionally may be fluorinated. The lubricant concentrates employed within the method according to the present invention do not need to contain the before mentioned additives as further components, since they are also associated with disadvantages. Chelating agents such as EDTA are used to prevent lime soap formation on the conveyor belt. The formation of lime soap on a conveyor belt normally occurs by employing neutral to alkaline lubrication conditions. The lime soap formation has the negative side effect that it drastically reduces or even stops the lubrication on the respective conveyor belt. The employment of chelating agents such as EDTA has the negative side effect that they are not readily biodegradable. Due to the presence of the free fatty acid and also of the corrosion inhibitor and the optionally contained organic acids, the employed lubricant concentrates of the present invention are in the acidic range of the pH-spectrum and no formation of lime soap occurs. In addition, the rather low pH-range of the lubricant concentrate provokes a biostatic effect and no growing of bacteria or food and/or average parasites occurs. A further stabilization of the respective lubricant concentrate is obtained when employing another acid, such as acetic acid.

A further advantage is that the lubricant concentrate containing at least one free fatty acid and a corrosion inhibitor can be employed both as dry lubricant and as wet lubricant. This allows a combination of both methods on the same conveyor belt system. For example, the refilling of a used glass container consists of several individual steps, whereby said glass container is transported on a conveyor belt to individual sections integrated into the conveyor belt to carry out the individual steps (such as bottle washing, filling or labelling). It is therefore possible to carry out some of the individual steps employing a dry lubricant, and during one or more of the individual steps a wet lubricant is employed. This option is, for example, an advantage in respect of the final packaging step during the refilling of a glass container, when the blackening of the bottom surface of said container can be avoided/minimised due to the employment of a wet lubrication at the end of the refilling process.

Alternatively, the lubrication of parts or the entire conveyor belt can be carried out as wet lubrication for certain time intervals in order to provide easy cleaning of the respective conveyor belt and avoiding the blackening of the bottom surface of the object to be transported. This means, that the operation of the respective conveyor belt has not to be interrupted at all for carrying out the cleaning step. Instead, the operation of the whole system can be continued by simply switching the mode of lubrication from dry lubrication to wet lubrication and vice versa.

The term "dry lubricant" in connection with the present invention means that the employed lubricant is applied on the respective conveyor belt in a way that the respective lubricant remains on the surface of said conveyor belt either completely or at least substantially. Remaining substantially means that not more than 10% by volume of the employed lubricant are flown off the respective conveyor belt. For the sake of clarity, it is indicated that the dry lubricant itself is usually employed as a liquid, for example, as an emulsion or a solution. The process (method) connected with the application of said dry lubricant is defined as "dry lubrication (process)". Preferably, the lubricant concentrate is added within a dry-lubrication process according to the present invention at a ratio of 1.5 to 20 ml/h, in particular about 5 ml/hour, on the respective conveyor belt (per conveyor belt track depending on ordinary size of 5-20 m, preferably about 12 m).

The term "wet lubricant" in connection with the present invention means that the respective lubricant is applied onto the surface of a conveyor belt in a way that a significant amount of the lubricant employed or the liquid containing the lubricant flows off from the surface of the respective conveyor belt. Preferably, at least 30% of volume of the employed amount of liquid flows off, more preferably at least 50% by volume, in particular at least 90% by volume. Preferably, the lubricant is added within a wet lubrication process at a ratio of 1.5 to 20 l/hour on the respective conveyor belt (per conveyor belt track/ordinary size).

The term "lubricant concentrate" in connection with the present invention means that the respective lubricant contains one free fatty acid or a mixture of two or more free fatty acids in an amount of at least 0.1 wt.-% and at least one corrosion inhibitor. The lubricant concentrate may contain further components including water or organic solvents, resulting in a total of 100 wt.-% (sum of free fatty acids and further components).

The term "use solution (of a lubricant)" in connection with the present invention means that the amount of one free fatty acid or a mixture of two or more free fatty acids contained within the respective lubricant is below 0.1 wt.-%, preferably below 0.01 wt.-%. Usually a use solution of a lubricant is obtained by diluting the respective lubricant concentrate with a solvent, preferably with water, by a factor of 1000 to 10000.

Subsequently, the method of lubricating a conveyor belt according to the present invention is explained in detail.

The lubricant concentrate employed as dry lubricant (in a dry lubrication process) contains as a first component at least one free fatty acid. The free fatty acid may be any fatty acid known to the skilled person. Preferably, the free fatty acid is a $C_8$-$C_{22}$-fatty acid such as capric acid, lauric acid, myristic acid, palmitic acid, stearic acid, oleic acid or linoleic acid. The fatty acid may be a saturated fatty acid, a mono-unsaturated fatty acid or a polyunsaturated fatty acid.

Most preferably, the free fatty acid is oleic acid.

The term "free fatty acid" in connection with the present invention means that the acidic functional group (carboxylic group) of the respective fatty acid is not blocked by or reacts with any other component of the respective lubricant. Preferably, the respective lubricant does not contain any counter ions which may block and/or react with the carboxylic group of the respective fatty acid. In particular, the respective lubricant does substantially not contain any cationic ions or other cationic components which may act as a counter ion of the carboxylic group. In addition, the respective lubricant concentrate is preferably free of any amines.

If the lubricant concentrate contains any other components, which may block or react with the acidic functional group of the employed free fatty acid, the amount of fatty acid employed in the lubricant concentrate according to the present invention has to be raised to a level, which effects a concentration of at least 0.1 wt.-% of free fatty acid. Methods for detection of the amount of the free fatty acids contained in a composition, such as a lubricant concentrate, are known in the art.

The lubricant concentrate generally contains at least one free fatty acid or a mixture of two or more free fatty acids in an amount of at least 0.1 wt-%, preferably in an amount of 0.1 to 25 wt-%, more preferably in an amount of 0.3 to 5 wt.-%.

In one embodiment of the present invention a lubricant concentrate is employed containing 0.1 to 25 wt-% of at least one free fatty acid and 5 to 95 wt.-% of water, preferably deionised water, and additionally at least 0.1 wt.-% of a corrosion inhibitor.

The lubricant concentrate further contains as a second component at least one corrosion inhibitor. Preferred corrosion inhibitors are phosphoric acid esters (phosphate esters), which may contain fragments derived from ethylene oxide (EO) such as oleyl-3EO-phosphate esters.

In general the phosphate ester has the formula OP(OX)$_3$ where X is independently H or R and R may represent an aryl or alkyl group. Preferably, the phosphate ester is at least one compound having the formulae (I) or (II)

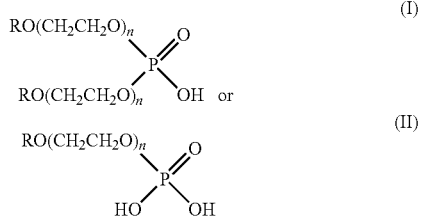

where R is any alkyl or alkylaryl group; n can (independently from another) equal from 1 to 10. Within formulae (I) or (II), R may have the same or a different meaning, if R is present more than once. Preferably, the phosphate esters do not contain any ions such as Na or K. Alkyl may be for example $C_1$-$C_{20}$-alkyl, aryl may be phenyl. In one embodiment of the present invention, a mixture of at least one compound of formula (I/diester) and at least one compound of formula (II/monoester) is employed. The ratio of diester to monoester within said mixture is from 1:4 to 4:1 [wt.-%/wt.-%], preferably about 1:1 [wt.-%/wt.-%]. In a preferred embodiment of the present invention, the phosphate ester is at least one diester according to formula (I). The diester may contain up to 10 wt.-% of the respective monoester (as a by-product).

Preferred examples of phosphate esters according to formulae (I) or (II) are ($C_{16}$-$C_{18}$)-alkyl-O-5EO-phosphate ester (mixture of mono- and diestester), (cetyl-oleyl)-O-4EO-phosphate ester (mixture of monoester and diester), ($C_{12}$-$C_{14}$)-alkyl-O-4EO-phosphate ester (mixture of monoester and diester), ($C_{13}$-$C_{15}$)-alkyl-O-3EO-phosphate ester, ($C_{13}$-$C_{15}$)-alkyl-O-7EO-phosphate ester, oleyl-O-4EO-phosphate ester (mixture of monoester and diester), lauryl-O-4EO-phosphate ester and $C_{17}$-alkyl-O-6EO-phosphate ester (mixture of mono- and diester, preferably in a ratio of 5.5:4.5). Within said phosphate esters, a term such as "($C_{16}$-$C_{18}$)" means that the respective alkyl residue may vary in its chain length from $C_{16}$ to $C_{18}$ or a mixture of said alkyl residues of the respective chain length are employed. The same applies to terms such as "(cetyl-oleyl)". Said preferred phosphate esters are commercially available under the tradenames Phospholan PE 65 (Akzo Nobel), Maphos 54P (BASF), Maphos 74P (BASF), Maphos 43T (BASF), Maphos 47T (BASF), Lubrhophos LB-400 (Rhodia), Lubrhophos RD-510 (Rhodia) and Lakeland PAE 176 (Lakeland). More preferably, the phosphate esters according to formula (I) or (II) contain a ($C_{12}$-$C_{18}$)-alkyl fragment and 3 to 6 EO-fragments.

The presence of a corrosion inhibitor within the lubricant concentrate employed in the present invention is connected with the advantages of providing anti-corrosive properties, emulsifying effects, lowering the pH-value to a range of preferably 1 to 3 and also reducing the blackening during a dry lubrication process.

A further class of preferred corrosion inhibitors are alkoxylated carboxylic acids, which are also known as alkylethercarboxylic acids and are saturated or unsaturated carboxylic acids containing one or more ether groups or mixtures thereof. Alkoxylated is preferably ethoxylated and means that the respective ethoxylated compound contains one or more fragments derived from ethylene oxide (EO-fragment). 3EO means that the respective compound contains 3 fragments derived from ethylene oxide This definition also applies to the below or above mentioned compounds such as alkoxylated fatty alcohols, alkoxylated esters or alkoxylated phosphate esters.

Preferred ethoxylated carboxylic acids contain a $C_4$-$C_{18}$-alkyl fragment and 1 to 6, preferably 3 to 6, EO-fragments. $C_4$-$C_{18}$-alkyl means that the respective fragment contains from 4 up to 18 carbon atoms, which form an alkyl residue or a mixture of the at least two alkyl residues within the indicated range is employed. Usually, ethoxylated carboxylic acids are employed as mixtures of two more acids, such as ($C_{16}$-$C_{18}$)-alkylether carboxylic acid. Preferred examples of ethoxylated carboxylic acids are $C_{12}$-alkyl-4EO-carboxylic acid, ($C_{16}$-$C_{18}$)-alkyl-2EO-carboxylic acid, ($C_{16}$-$C_{18}$)-alkyl-5EO-carboxylic acid, ($C_{16}$-$C_{18}$)-alkyl-10,5EO-carboxylic acid or ($C_4$-$C_8$)-alkyl-8EO-carboxylic acid. More preferably, the ethoxylated carboxylic acid is $C_{1-2}$-alkyl-4EO-carboxylic acid. Ethoxylated carboxylic acids are commercially available, for example, from Kao Chemicals GmbH (Emmerich, Germany) under the trade names Akypo RLM 25, Akypo RO 20, Akypo RO 50, Akypo RO 90, Akypo RCO 105 or Akypo LF2. In one preferred embodiment of the present invention, the ethoxylated carboxylic esters contain a ($C_{12}$-$C_{18}$)-alkyl fragment and 3 to 6 EO-fragments. Examples are $C_{12}$-alkyl-4EO-carboxylic acid, or ($C_{16}$-$C_{18}$)-alkyl-5EO-carboxylic acid.

In one embodiment of the present invention, the corrosion inhibitor is at least one phosphate ester and at least one alkoxylated carboxylic acid. In another embodiment of the present invention, the corrosion inhibitor is at least one phosphate ester. In a further embodiment of the present invention, the corrosion inhibitor is at least one alkoxylated carboxylic acid.

The lubricant concentrate generally contains at least one corrosion inhibitor in an amount of at least 0.1 wt-%, preferably in an amount of 0.1 to 25 wt.-%, more preferred in an amount of 0.1 to 9.0 wt.-%.

Besides the free fatty acid, the corrosion inhibitor and optionally water, the lubricant concentrate may contain one or more further components known by a skilled person such as surfactants, emulsifiers, acids such as strong or weak organic acids, for example, saturated or unsaturated carboxylic acids containing one or more ether groups, solvents, or fatty alcohols. The optional components as well as the corrosion inhibitor are chosen in a way that they do not hinder the free availability of the carboxylic group of the free fatty acid. The optional components are also chosen in a way that they are compatible with each other, for example, in respect of their miscibility.

Examples for suitable surfactants can be found in WO 01/07544 or U.S. Pat. No. 6,427,826. Preferred surfactants include alkylbenzenesulfonic acid, carboxylic acids, alkylphosphonic acids and their calcium, sodium and magnesium salts, polybutenylsuccinic acid derivatives, silicone surfactants, fluorosurfactants, and molecules containing polar groups attached to an oil-solubilizing aliphatic hydrocarbon chain. If stable and existing, the above indicated preferred surfactants are employed in their acidic form and not as salts. The surfactants are used in an amount to give desired results. This amount can range from 0 to about 30, preferably about 0.5 to about 20 wt.-% for the individual component, based on the total weight of the composition.

Emulsifiers (emulsifying agents) are also known by a skilled person, they may comprise compounds, which may also be employed as (organic) solvents or surfactants. Preferred emulsifiers according to the present invention are alkoxylated fatty alcohols, alkoxylated esters, fatty alcohols or phosphate esters which are optionally alkoxylated.

Preferred fatty alcohols are cetyl alcohol or oleyl alcohol, in particular cetyl alcohol (1-hexadecanol). Alkoxylated fatty alcohols are preferably ethoxylated fatty alcohols. Ethoxylated fatty alcohols suitable as emulsifiers are commercially available from BASF AG (Ludwigshafen, Germany) under the trade names Lutensol XL-Series (such as XL 70), Emulan EL, Emulan NP 2080, Emulan OC, Emulan OG, Emulan OP25, or Emulan OU. Preferred examples of ethoxylated fatty alcohols are $RO(C_2H_4O)_xH$ with $R=C_{10}H_{21}$ and $x=4, 5, 6, 7, 8, 9, 10$ and $14$.

Alkoxylated esters are preferably ethoxylated esters. Ethoxylated esters are esters of carboxylic acids containing one or more ether groups (EO-fragments) within the ester fragment derived from the corresponding alcohol. Preferred ethoxylated esters are ethoxylated fatty acid esters, in particular ethoxylated esters of oleic acid, which is commercially available from BASF AG under the trade name Emulan A.

In a preferred embodiment of the present invention, the lubricant concentrate further contains at least one acid. This acid does not fall under the definitions of a (free) fatty acid as indicated above. Preferably, this acid is selected from strong or weak organic acids, including alkoxylated carboxylic acids.

More preferably, this acid is a weak organic acid such as propionic, glycolic, gluconic, citric, acetic or formic acid, in particular acetic acid. The presence of said (additional) acid within the lubricant concentrate effects a better adjustment of a lower pH-value of the lubricant concentrate, preferably a ph-value of 1-3, in particular 2. If present, the concentration of said (additional) acid is an amount of at least 0.1 wt.-%, preferably in an amount of 0.1 to 25%, more preferably 0.1 to 5.0 wt.-%.

The lubricant concentrate employed in the dry lubrication process according to the present invention preferably has a pH-value of 1-3, in particular 2. However, the pH-value may even be below 1 or above 3. If the lubricant concentrate is further diluted, for example, if a dry lubrication process is combined with a wet lubrication process, then the use solution (lubricant concentrate diluted with, for example, water) usually has a pH-value in the range of 5.5 to 7.5, preferably 7.

In another embodiment of the present invention, a lubricant concentrate is employed containing 0.1 to 25 wt-% of at least one free fatty acid, 0.1 to 25 wt.-%, preferably 0.1 to 9.0 wt.-% of at least one corrosion inhibitor, 0.1 to 25 wt.-%, preferably 0.1 to 5.0 wt.-% of at least one acid and 5 to 95 wt-% of water and/or at least one organic solvent. Preferred organic solvents are glycol ethers, in particular dipropylene glycolmethyl ether, which is commercially available under the trade name Dovanol DPM from Dow Chemicals. Optionally, mixtures of water and at least one organic solvent may also be employed. If the lubricant concentrate contains an organic solvent, preferably more than 10 wt.-%, said concentrate is preferably applied onto the conveyor belt as a (clear) solution and/or discontinuously.

In a preferred embodiment of the present invention, a lubricant concentrate is employed containing 0.1 to 25 wt.-% of at least one free fatty acid, 0 to 95 wt.-% of water, 0.1 to 95 wt.-% of at least one emulsifier, 0 to 25 wt.-% of at least one acid, 0 to 30 wt.-% of at least one further component, preferably a surfactant and 0.1 to 25 wt.-% of at least one corrosion inhibitor. Preferably, the lubricant concentrate is applied onto the conveyor belt as an emulsion and/or discontinuously.

In another preferred embodiment of the present invention, a lubricant concentrate is employed wherein the amount of vegetable oils, in particular rapeseed oil, soy oil, palm oil, olive oil or sunflower oil, is below 20 wt-%, more preferably below 10 wt.-%, much more preferably below 5 wt.-% and most preferably below 1 wt.-%.

In one embodiment of the present invention, a lubricant concentrate is employed which does not contain any neutralizer in a substantial amount. In a substantial amount in connection with neutralizers as well as the below indicated mineral oils, complexing agents or polyalkylene polymers means that the neutralizer is not present at all within the employed lubricant concentrate or its concentration is below an amount of 0.05 wt. %, preferably 0.01 wt.-% of the lubricant concentrate. Examples for neutralizers (neutralizing agents) are alkaline metal hydroxides such a potassium hydroxides and sodium hydroxides, ammonia, buffers such as sodium carbonate, potassium carbonate or sodium phosphate, alkyl amines, such as primary, secondary, tertiary amines or alkanol amines and amines such as fatty alkyl substituted amines.

In another embodiment of the present invention, a lubricant concentrate is employed which does not contain a polyalkylene glycol polymer in a substantial amount. Such polyalkylene glycol polymers include polymers of alkylene oxides or derivatives and mixtures or combinations thereof, usually having a molecular weight of at least 1000 up to about hundreds of thousands. Such polyalkylene glycol polymers are disclosed, for example, in U.S. Pat. No. 6,855,676.

In another embodiment of the present invention, a lubricant concentrate is employed, which does not contain chelating agents in a substantial amount. In particular, such chelating agents are ethylene diamine tetraacetic acid (EDTA) or salts thereof, in particular disodium or tetrasodium salt, iminodisuccinic acid sodium salt, trans-1,2-diaminocyclohexane tetracetic acid monohydrate, diethylene triamine pentacetic acid, sodium salt of nitrilotriacetic acid, pentasodium salt of N-hydroxyethylene diamine triacetic acid, trisodium salt of N,N-di(beta-hydroxyethyl)glycine, or sodium salt of sodium glucoheptonate.

In another embodiment of the present invention, a lubricant concentrate is employed, which does not contain any mineral oils in a substantial amount. Mineral oils within the present invention comprise also silicon-based oils, fluorinated oils and fluorinated greases, available under the trademark "Krylox" from DuPont Chemicals and other synthetic oils.

The lubricant concentrate may be prepared as known in the art, for example, by mixing the individual components in any order. However, lubricant concentrates according to the present invention may also be prepared by diluting a first concentrate containing at least one free fatty acid (and a corrosion inhibitor) with a solvent such as water under the proviso that the obtained mixture still contains 0.1 wt.-% of at least one free fatty acid or of a mixture of two or more free fatty acids.

The method according to the present invention can be employed on any conventional conveyor belt systems (units) known to a person skilled in the art. The conveyor belt system, in particular the chains and tracks, may be partially or completely made of any material known in the art such as steel, in particular stainless steel, or plastic. Such conveyor belt (installations) are widely used for example in the food and/or beverage industry, for example, for the cleaning, filling or refilling of containers such as bottles. Usually, a conveyor belt system contains several individual conveyor belts (conveyor belt sections).

The object to be transported on the respective conveyor belt may be any object known by a skilled person to be employed in this respect, such as containers, in particular bottles, cans or cardboards. Said object may be partially or completely made of any material such as metal, glass, carton or plastic, preferably made of glass or plastic. Preferred plastic articles or containers are made of polyethylene terephthalate (PET), polyethylene naphthalate (PEN), polycarbonate (PC) or polyvinylchloride (PVC).

In one embodiment of the present invention the conveyor belt is partially or completely made of steel, in particular stainless steel, and/or the object transported on the conveyor belt is partially or completely made of glass, in particular a glass bottle. This embodiment of the present invention is preferably employed in a process for filling and in particular for refilling such objects.

In the method according to the present invention, the lubricant concentrate employed as a dry lubricant may be applied onto the respective conveyor belt by any method known in the state of the art. WO 01/07544 provides an overview of potential ways of applying the lubricant concentrate onto the (upper) surface of the conveyor belt. As an applicator a spray nozzle, a metered diaphragm pump, a brush applicator or a so-called flicker may be employed. The lubricant concentrate may be applied continuously or preferably discontinuously. For example, the lubricant concentrate may be discontinuously applied onto the conveyor belts surface every five minutes, twenty minutes or even every 24 hours, depending on the objects to be transported.

In one embodiment of the present invention, the lubricant concentrate containing at least one free fatty acid and a corrosion inhibitor is employed (only) in at least one section of the conveyor belt (system) as a dry lubricant. In this embodiment a use solution of a lubricant is employed as a wet lubricant in the remaining (at least one) sections of the same conveyor belt (system). Preferably, the use solution of a lubricant employed as a wet lubricant in the remaining sections of the conveyor belt is made from a lubricant concentrate containing at least one free fatty acid and a corrosion inhibitor. More preferably, the lubricant concentrate to be employed as dry lubricant and the use solution of a lubricant employed as a wet lubricant are made from the same lubricant concentrate.

In another embodiment of the present invention, a rinse step (washing step) with water is temporarily carried out on (or for) at least one or even all of the individual sections of the conveyor belt (system), onto which a lubricant concentrate is applied as a dry lubricant. The rinse step is carried out for a certain period of time, preferably for 10 up to 30 minutes. Afterwards, the lubricant concentrate containing 0.1 wt.-% of at least one free fatty acid and a corrosion inhibitor can again be applied onto the respective conveyor belt (sections) as a dry lubricant without (significantly) interrupting or disturbing the transportation of the objects such as glass bottles.

Said embodiments are preferably employed in transportation of objects on conveyor belts, whereby the conveyor belt is integrated into different operation units (sections) to carry out for example bottle washing, sorting, filling, labelling or packaging steps. Preferably, said embodiments are employed in the process of filling or refilling of glass containers, in particular glass bottles, in particular on a conveyor belt partially or completely made of steel, preferably stainless steel.

Preferably, the individual sections of the conveyor belt may be integrated into, connected with or placed in between a depelletizer, a bottle sorting unit, a bottle washer, a filler unit, a capping unit, a labelling unit, a packaging unit (area), a crate conveyor unit and/or an area for electronic bottle inspections. The respective sections (units) may be connected with each other in any order and/or number.

More preferably, the temporary rinse step or the wet lubrication according to the above embodiments are carried out or employed between a depelletizer (unit) and a bottle washer, a depelletizer and a bottle sorting unit, a bottle sorting unit and a bottle washer and/or a filling unit and a labelling unit.

In another embodiment of the present invention the method of lubricating a conveyor belt is carried out in respect of the lubrication of the respective conveyor belt system employing a lubricant concentrate containing at least one free fatty acid and a corrosion inhibitor as a dry lubricant in a dry lubrication process which is temporarily combined with a wet lubrication of the respective conveyor belt employing a use solution of a lubricant. The use solution is preferably a use solution of a lubricant concentrate containing at least one free fatty acid and a corrosion inhibitor. The temporary wet lubrication can be carried out on the entire conveyor belt (system) or only in parts thereof (sections). This embodiment is preferably carried out in case of removing dirt from the conveyor belt when employing a lubricant concentrate as a dry lubricant according to the present invention. When the use solution of a lubricant containing at least one free fatty acid and a corrosion inhibitor is employed, the operation of the respective conveyor belt does not have to be stopped during said washing step.

Another subject of the present invention is the use of a lubricant concentrate containing 0.1 wt.-% of at least one free fatty acid and at least one corrosion inhibitor as defined above as a dry lubricant in a dry lubrication process. Preferably, said lubricant concentrate is used for lubricating a conveyor belt.

The following examples serve to present a more detailed explanation of the invention.

EXAMPLES

In the following, all percent (%)-volumes of components of compositions are expressed as percent-by-weight (wt.-%) unless indicated otherwise.

1. Track Conveyor Testing
1.1. Description of Test Method Lubricity and Durability
1.1.1. Test Track The trials are carried out on a pilot conveyor facility. This pilot conveyor contains stainless steel and plastic (Acetal) test tracks.

1.1.2. Test Procedure

The following standard test procedure is applied:
1. Prior doing any trials, ensure that the test track is free of residues. If necessary, clean the track with an acidic or alkaline cleaner and/or with alcohol to remove any traces of lubricants from the previous trial.
2. Rinse the track with water (approx. 10 min) and dry it with Kleenex.
3. Start the program for the digital track conveyor system.
4. After 2 min: pipette 10 ml of the respective composition directly on the chain. This process has to be done very carefully and slowly to ensure, that the whole chain surface is being treated. Use a plastic cloth or a brush to support spreading.
5. After 20 min from start: switch on the tap water flush (approx. 8 ltr./min.).
6. After 10 min rinsing: stop program 1.2. Evaluation During the trial, 6-8 bottles are placed on the test track. The pulling power (Fz) is constantly measured via an electronic scales with A/D converter. The measurement is limited to a maximum of 2 kg. The coefficient pulling power/weight of bottles or cans represents the friction coefficient which expresses the lubricity ($\mu=F_Z/F_N$). This data is finally transferred to MS Excel and the values ($\mu$) can be read out in the middle of the amplitude. Durability is recorded during the water flush. Durability is the resistance of a lubricant to unfavourable conditions such as heavy loading or water wash off.

2. Trials
2.1. Glass Bottles on Stainless Steel Tracks

Tests are carried out with 8 glass bottles with a total weight of 8.1 kg.

2.1.1. Concentrate Compositions According to the State of the Art

A concentrate of a lubricant 1 is prepared, containing 3.68% N-oleyl-1,3-diaminopropane, 3.6% ($C_{16-18}$) alkyl (9EO) carboxylic acid and 6% polyethylene glycol (M=200) added up with softened water to 100%. 5% of this lubricant 1 diluted with 95% $H_2O$ has been used as concentrate A and 95% of this lubricant 1 diluted with 5% $H_2O$ is used as concentrate B.

Oil in water emulsions are prepared (listed below) by shaking the ingredients in small 20 ml screw top glasses.

Concentrate C: 50% silicone oil (Dow Corning 200) and 50% $H_2O$

Concentrate D: 95% sunflower oil and 5% $H_2O$

Concentrate E: 75% mineral oil and 25% $H_2O$

Concentrate F: 5% of oleic acid and 95% dipropylene glycol-methyl ether 2.1.2. Concentrate Compositions According to the Present Invention Concentrates 1 and 2 contain oleic acid as free fatty acid. A concentrate of a lubricant 2 is prepared containing 33% oleyl-O-3EO-phosphate ester, 4% ($C_{16}$-$C_{18}$)-alkyl-5EO-carboxylic acid, 33% ($C_{16}$-$C_{18}$)-alkyl-2EO-carboxylic acid, 13% oleic acid, 8% cetyl alcohol (1-hexadecanol) and 9% ($C_4$-$C_8$)-alkyl-8EO-carboxylic acid.

Concentrate 1: 8% of lubricant 2 and 92% $H_2O$

Concentrate 2: 100% of lubricant 2

2.1.3. Results

Table 1 below shows friction coefficients ($\mu$) at different time stages. As the application of lubricant starts after 2 min. the values at 10 and 20 min. show lubricity. The water flush starts after 20 min, so 25 min and 30 min are indicators for the durability. Values ($\mu$)>0.15 show insufficient lubricity and exceeds the measurement device limit.

TABLE 1

| Concentrate | 0 min. | 10 min. | 20 min. | 25 min. | 30 min. |
|---|---|---|---|---|---|
| A | 0.2 | 0.20 | 0.20 | >0.25 | >0.25 |
| B | 0.23 | 0.125 | 0.10 | >0.25 | >0.25 |
| C | 0.22 | 0.135 | 0.14 | 0.14 | 0.185 |
| D | 0.20 | 0.10 | 0.10 | 0.11 | 0.2 |
| E | 0.20 | 0.09 | 0.09 | 0.11 | 0.2 |
| F | 0.23 | 0.10 | 0.10 | 0.10 | 0.13 |
| 1 | 0.25 | 0.09 | 0.09 | 0.12 | 0.14 |
| 2 | 0.20 | 0.08 | 0.07 | 0.13 | 0.14 |

The concentrates of the invention (1 to 2) show in most cases a significant decrease of friction compared to prior art (A-F). An improved performance is noticed with concentrates 1 to 2 because of longer remaining lubricity during the wash off (rinse step starting after 20 min).

3. Inhibition of Corrosion

TABLE 2

| Ex. | 2.5% (w/w) | 1.0% (w/w) | water (w/w) | Corrosion inhibitor 2.5% (w/w) | pH | weight loss [mg] |
|---|---|---|---|---|---|---|
| 1) | oleic acid* | Lutensol XL70 | 96.50 | | 3.30 | 4.20 |
| 2) | oleic acid | Lutensol XL70 | 96.50 | | 6.60 | 3.40 |
| 3) | oleic acid | Lutensol XL70 | 94.00 | (C16-C18)-alkyl-O-4-EO-phosphate ester (I + II) | 3.00 | 0.07 |
| 4) | oleic acid | Lutensol XL70 | 94.00 | (C13-C15)-alkyl-O-3-EO-phosphate ester (I + II) | 3.00 | 1.90 |
| 5) | oleic acid | Lutensol XL70 | 94.00 | (C13-C15)-alkyl-O-3-EO-phosphate ester (II) | 3.00 | 2.50 |
| 6) | oleic acid | Lutensol XL70 | 94.00 | C12-alkyl-4-EO-carboxylic acid | 3.00 | 0.04 |
| | *pH adjusted with strong mineral acid | emulsifier: C10-alkyl-O-7EO-H | | (I + II) = mixture of diester and monoester (II) = monoester | | |

Mild Steel Plates (ST37) with the dimensions of 50 mm×100 mm×2 mm are treated with hypochloric acid (32% w/w), rinsed with deionised water and ethanol, dried for one hour at 100° C., cooled down in an exsiccator and then weighted. The pretreated plates are immersed in 350 ml of the test solutions for 22 hours, rinsed with deionised water and ethanol, dried for one hour at 100° C., cooled down in an exsiccator and than reweighted.

As it can be seen from table 2, a significant inhibition of corrosion can be obtained by the examples according to the present invention (examples 3-6 versus examples 1-2).

4. Blackening

| Concentrate | Degree of Blackening |
|---|---|
| 1 | 2 |
| 2 | 2 |
| F | 4 |

Blackening is estimated on a scale from 1 to 5 with some concentrates as indicated above under item 2.1. Where 1 means no Blackening and 5 means unacceptable. For a visual assessment lubricant concentrates are applied and the conveyor runs for 30 min with fixed glass bottles. After the run the bottom of the bottles are wiped with tissues and the degree of blackening on the tissues is rated.

The invention claimed is:

1. A method of lubricating a conveyor belt in a dry lubrication process, comprising applying a dry lubricant to the conveyor belt in a way that not more than 10% by volume of the dry lubricant flows off the conveyor belt, wherein the dry lubricant comprises a lubricant concentrate containing at least 0.1 wt.-% of at least one free fatty acid and at least one corrosion inhibitor, wherein the at least one corrosion inhibitor comprises at least one phosphate ester and at least one ethoxylated carboxylic acid, wherein the phosphate ester comprises a compound having the formula (I) or (II),

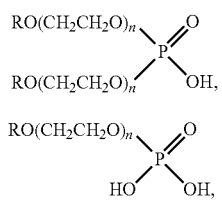

and R is a $(C_{12}-C_{18})$-alkyl fragment; each n is independently 1 to 10; and
the ethoxylated carboxylic acid contains a $(C_4-C_{18})$-alkyl-fragment and 1 to 6 EO-fragments; and
wherein the lubricant concentrate does not contain an amine.

2. The method according to claim 1, wherein the free fatty acid is oleic acid.

3. The method according to claim 1, wherein the conveyor belt is partially or completely made of steel and/or the object transported on the conveyor belt is partially or completely made of glass.

4. The method according to claim 1, wherein the lubricant concentrate contains:
0.1 to 25 wt.-% of at least one free fatty acid,
0.1 to 25 wt.-% of at least one corrosion inhibitor,
0.1 to 25 wt.-% of at least one acid, and
5 to 95 wt.-% of water and/or at least one organic solvent.

5. The method according to claim 1, wherein the lubricant concentrate contains 0.1 to 25 wt.-% of at least one free fatty acid, 0 to 95 wt.-% of water, 0.1 to 95 wt.-% of at least one emulsifier, 0 to 25 wt. % of at least one acid, 0 to 30 wt.-% of at least one surfactant and 0.1 to 25 wt. % of at least one corrosion inhibitor.

6. The method according to claim 1, wherein the lubricant concentrate is applied onto the conveyor belt as an emulsion or a solution.

7. The method according to claim 1, wherein the lubricant concentrate is applied to at least one section of the conveyor belt as a dry lubricant and a use solution of a lubricant is applied as a wet lubricant to at least one section of the same conveyor belt.

8. The method according to claim 7, wherein the use solution employed as a wet lubricant is made from said lubricant concentrate.

9. The method according to claim 1, wherein a rinse step is temporarily carried out on at least one section of the conveyor belt.

10. The method according to claim 1, wherein the lubrication of the same conveyor belt is temporarily carried out as wet lubrication.

11. The method according to claim 1, wherein the lubricant concentrate contains 0.1 to 9.0 wt.-% of at least one corrosion inhibitor.

12. The method according to claim 4, wherein the lubricant concentrate contains 0.1 to 9.0 wt.-% of at least one corrosion inhibitor.

13. The method according to claim 1, wherein the free fatty acid is a $C_8-C_{22}$ fatty acid.

14. The method according to claim 1, wherein the at least one phosphate ester comprises a mixture of the compounds of formula I and formula II.

15. The method according to claim 14, wherein the ratio of the compound of formula I to the compound of formula II is from 1:4 to 4:1 wt-%/wt-%.

16. The method according to claim 1, wherein the ethoxylated carboxylic acid is a mixture of two or more such acids.

17. A method of lubricating a conveyor belt in a dry lubrication process, comprising
applying a dry lubricant to the conveyor belt in a way that not more than 10% by volume of the dry lubricant flows off the conveyor belt,
wherein the dry lubricant comprises a lubricant concentrate containing 0.1 to 25 wt.-% of at least one free fatty acid and 0.1 to 25 wt.-% of at least one corrosion inhibitor,
wherein the at least one corrosion inhibitor comprises at least one phosphate ester and at least one ethoxylated carboxylic acid,
wherein the phosphate ester comprises a compound having the formula (I) or (II),

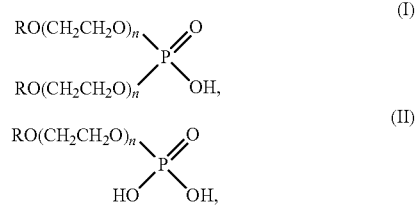

and R is a $(C_{12}-C_{18})$-alkyl fragment; each n is independently 1 to 10; and
the ethoxylated carboxylic is selected from the group consisting of $C_{12}$-alkyl-4EO-carboxylic acid, $(C_{16}-C_{18})$-alkyl-2EO carboxylic acid, $(C_{16}-C_{18})$-alkyl-5EO carboxylic acid, $(C_{16}-C_{18})$-alkyl-10,5EO carboxylic acid, $(C_{16}-C_{18})$-alkyl-8EO carboxylic acid, and $(C_4-C_8)$-alkyl-8EO-carboxylic acid, wherein EO is an ethylene oxide fragment.

18. The method according to claim 15, wherein the ethoxylated carboxylic acid is a mixture of two or more such acids.

19. The method according to claim 1, wherein the at least one ethoxylated carboxylic acid contains a $(C_{12}-C_{18})$-alkyl-fragment and 3 to 6 EO-fragments.

* * * * *